United States Patent
Kobayashi

(10) Patent No.: US 11,272,124 B2
(45) Date of Patent: Mar. 8, 2022

(54) IMAGE COMPOSITING DEVICE, IMAGE COMPOSITING METHOD, AND STORAGE MEDIUM

(71) Applicant: Morpho, Inc., Tokyo (JP)

(72) Inventor: Michihiro Kobayashi, Tokyo (JP)

(73) Assignee: Morpho, Inc., Tokyo (JP)

( * ) Notice: Subject to any disclaimer, the term of this patent is extended or adjusted under 35 U.S.C. 154(b) by 520 days.

(21) Appl. No.: 16/338,615

(22) PCT Filed: Oct. 31, 2017

(86) PCT No.: PCT/JP2017/039338
§ 371 (c)(1),
(2) Date: Apr. 1, 2019

(87) PCT Pub. No.: WO2019/087299
PCT Pub. Date: May 9, 2019

(65) Prior Publication Data
US 2021/0377457 A1 Dec. 2, 2021

(51) Int. Cl.
*H04N 5/265* (2006.01)
*G06K 9/62* (2022.01)
(Continued)

(52) U.S. Cl.
CPC ........... *H04N 5/265* (2013.01); *G06K 9/2054* (2013.01); *G06K 9/6202* (2013.01);
(Continued)

(58) Field of Classification Search
CPC .................................................... H04N 5/265
(Continued)

(56) References Cited

U.S. PATENT DOCUMENTS

| | | | |
|---|---|---|---|
| 7,847,823 B2 | 12/2010 | Habuka et al. | |
| 2009/0185721 A1 | 7/2009 | Hiraga et al. | |

(Continued)

FOREIGN PATENT DOCUMENTS

| | | |
|---|---|---|
| CN | 1846447 A | 10/2006 |
| CN | 101895682 A | 11/2010 |

(Continued)

OTHER PUBLICATIONS

Communication dated Jun. 12, 2020, from the Chinese Patent Office in Application No. 201780059369.1.

(Continued)

*Primary Examiner* — Joel W Fosselman
(74) *Attorney, Agent, or Firm* — Sughrue Mion, PLLC

(57) ABSTRACT

A device includes an acquiring unit acquiring a plurality of images including a first image, a second image, and a third image; a region detecting unit comparing pixel values of the first image and the third image to detect a moving object region; and a compositing unit generating a composite image by synthesizing a target image selected from a plurality of images and the second image wherein the compositing unit performs a ghost removing process for pixels of the target image corresponding to the moving object region and pixels of the second image corresponding to the moving object region to bring the pixel values of one of these images closer to the pixel values of the other image, and synthesizes the target image and the second image after the ghost removing process.

20 Claims, 7 Drawing Sheets

(51) Int. Cl.
*H04N 5/235* (2006.01)
*H04N 5/225* (2006.01)
*G06K 9/20* (2006.01)

(52) U.S. Cl.
CPC ......... *H04N 5/2256* (2013.01); *H04N 5/2351* (2013.01); *H04N 5/2352* (2013.01)

(58) Field of Classification Search
USPC ........................................................ 348/239
See application file for complete search history.

(56) References Cited

U.S. PATENT DOCUMENTS

| | | | |
|---|---|---|---|
| 2014/0212065 A1 | 7/2014 | Hirai et al. | |
| 2019/0253644 A1* | 8/2019 | Zhu | H04N 5/243 |

FOREIGN PATENT DOCUMENTS

| | | |
|---|---|---|
| CN | 103108122 A | 5/2013 |
| CN | 103168462 A | 6/2013 |
| CN | 103477626 A | 12/2013 |
| JP | 2004-236006 A | 8/2004 |
| JP | 2005-102116 A | 4/2005 |
| JP | 2009-296608 A | 12/2009 |
| JP | 2012-50121 A | 3/2012 |
| JP | 2012235377 A | 11/2012 |
| JP | 2013-240031 A | 11/2013 |
| JP | 2013-243780 A | 12/2013 |
| JP | 2014-39222 A | 2/2014 |
| JP | 2014068278 A | 4/2014 |
| JP | 2017-34536 A | 2/2017 |
| KR | 1020160039701 A | 4/2016 |

OTHER PUBLICATIONS

International Preliminary Report on Patentability with Translation of Written Opinion of the International Searching Authority for PCT/JP2017/039338 dated May 14, 2020.

International Search Report dated Dec. 5, 2017 from the International Searching Authority in counterpart International Application No. PCT/JP2017/039338.

* cited by examiner (A)

(B)

IMAGE COMPOSITING DEVICE, IMAGE COMPOSITING METHOD, AND STORAGE MEDIUM

CROSS REFERENCE TO RELATED APPLICATIONS

This application is a National Stage of International Application No. PCT/JP2017/039338 filed Oct. 31, 2017.

TECHNICAL FIELD

The present disclosure relates to an image compositing device, an image compositing method, and a storage medium.

BACKGROUND ART

Patent Document 1 discloses a device configured to correct ghosting of a moving object in a composite image. The device calculates motion data between a reference image and a comparative image. Next, the device calculates differences in pixel value between the reference image and the comparative image by block associated based on the motion data. Next, the device calculates an overlapping ratio of the comparative image with respect to the reference image by block based on the differences in pixel value. Next, the device generates a composite image by overlapping the comparative image on the reference image by using the motion data and the overlapping ratio. In this manner, the device described in Patent Document 1 calculates differences in pixel value on the basis that exposures of two images to be synthesized are the same.

Patent Document 2 discloses a device configured to correct ghosting in a High Dynamic Range composite image. The device calculates likelihoods of the moving object at respective pixels based on differences between a first image and a second image before matching exposures of the first image and the second image. Next, the device estimates an exposure conversion function for matching the exposures of the first image and the second image based on the likelihoods of the moving object. Next, the device calculates the likelihoods of the moving object at the respective pixels based on the differences between the first image and the second image, and synthesizes the first image and the second image by using the likelihoods of the moving object and the exposure conversion function. Specifically, after all the pixel values of the first image and the second image are corrected to have the same exposure, a composition ratio of the first image and the second image is adjusted. In this manner, the device described in Patent Document 2 is configured to calculate the differences in pixel value after correcting the entire images with an identical parameter to match the exposures of two images because the exposures of two images to be synthesized are different.

CITATION LIST

Patent Document

Patent Document 1: U.S. Patent Laid-open No. 20090185721
Patent Document 2: U.S. Patent Laid-open No. 20140212065

SUMMARY OF INVENTION

Technical Problem

When flash photography is performed by irradiating an object with flash light, a region exposed to the flash light partially gets light. In other words, the flash photographed image includes regions having different exposures even in the same image. When synthesizing images including regions having such different exposures with an image taken by normal photography, whether the difference in pixel value between both images is caused by the difference in exposure or caused by movement of the moving object cannot be distinguished with the device described in Patent Document 1 as a matter of course, and even with the device described in Patent Document 2.

In this technical field, an image compositing device, an image compositing method, and a storage medium capable of suppressing ghosting even when synthesizing an image including regions having different exposures and an image taken by normal photography have been desired.

Solution to Problem

An aspect of the present disclosure provides an image compositing device. The image compositing device generates a composite image by synthesizing at least two images from a series of a plurality of images obtained by photographing the same object. The image compositing device includes an acquiring unit, a region detecting unit, and a compositing unit. The acquiring unit acquires a plurality of images including a first image photographed under a first exposure condition at a first timing, a second image photographed under a second exposure condition at a second timing, and a third image photographed under the first exposure condition at a third timing. The region detecting unit compares pixel values of the first image and the third image and detects a moving object region, which is a region where a moving object is present. The compositing unit generates a composite image by synthesizing a target image selected from the plurality of images and the second image. The compositing unit performs the ghost removing process for pixels of the target image corresponding to the moving object region and pixels of the second image corresponding to the moving object region to bring the pixel values of one of these images closer to the pixel values of the other image, and synthesizes the target image and the second image after the ghost removing process.

In this image compositing device, two images photographed under the same exposure condition (for example, the first exposure condition) of a series of plurality of images are used to determine the moving object region. Even when exposures of the entire images are different, or even when regions having partially different exposures in the entire images are present, regions having different exposures appear in the same manner if the images are photographed under the same exposure condition. Therefore, the device can determine the moving object region with high degree of accuracy. In the device, the determined moving object region is used when synthesizing an image photographed under an exposure condition (for example, second exposure condition) different from the exposure condition under which the images used for determining the moving object region is taken. Since the moving object regions are determined with high degree of accuracy, the device is enabled to suppress the ghosting as a result, even when an image including a region having different exposure and an image taken by a normal photography are synthesized.

In an embodiment, the first image and the third image may be images photographed without irradiation of flash light, and the second image may be an image photographed with irradiation of flash light. In this case, the first image and the third image have exposure different from the second image. In this case as well, the device is able to suppress the ghosting. When either one of the first exposure condition and the second exposure condition is employed as a condition of photography with an irradiation of the flash light, employing the second exposure condition as the condition of photography with irradiation of flash light enables application also to the imaging device having a difficulty to emit the flash light consecutively in a short time.

In an embodiment, the second timing may come after the first timing, and the third timing may come after the second timing. In this case, the first image, the second image, and the third image may be photographed in this order. In other words, the moving object region is detected by using images before and after the timing of photographing the second image. Therefore, the device enhances the positional accuracy of the moving object region in the second image.

In an embodiment, the ghost removing process may be a process of overwriting one of pixel values of pixels of the target image corresponding to the moving object region with pixel values of pixels of the second image corresponding to the moving object region with the other pixel value. In this configuration, the device is able to suppress ghosting.

In an embodiment, the ghost removing process may be a process of comparing luminance values of pixels of the target image corresponding to the moving object region and luminance values of pixels of the second image corresponding to the moving object region and overwriting lower luminance values with a higher luminance values. In this configuration, ghosting caused by the moving object included in a background may be suppressed.

In an embodiment, the ghost removing process may include a process of synthesizing pixels of the target image corresponding to the moving object region and pixels of the second image corresponding to the moving object region by using a compositing mask blurred at a predetermined degree. In this configuration, the device is able to suppress a boundary of the compositing mask from becoming unnatural.

In an embodiment, the compositing unit may synthesize the target image and the second image by using a mixing ratio determined by the difference between the luminance values of the target image and the second image after the ghost removing process. In this configuration, the device is able to synthesize the target image and the second image while reflecting the difference in illuminance. For example, when photographing a person with flash light at night, the device is able to synthesize a person appearing brightly with the flash light and a background appearing brightly by not using flash light.

In an embodiment, the target image may be the first image or the third image. In this configuration, the device may use the image itself from which the moving object region is detected as a target of synthesis, and thus the positional accuracy of the moving object region is enhanced.

Other aspects of the present disclosure provides an image compositing method. The image compositing method is a method of generating a composite image by synthesizing at least two images from a series of a plurality of images obtained by photographing the same object. The method includes an acquiring step, a region detecting step, and a compositing step. In the acquiring step, a plurality of images including a first image photographed under a first exposure condition at a first timing, a second image photographed under a second exposure condition at a second timing, and a third image photographed under the first exposure condition at a third timing are acquired. In the region detecting step, pixel values of the first image and the third image are compared and a moving object region, which is a region where a moving object is present is detected. In the compositing step, a target image selected from a plurality of images and the second image are synthesized to generate a composite image. The compositing step includes performing a ghost removing process for pixels of the target image and the second image corresponding to the moving object regions to bring pixel values of one of these images closer to the pixel values of the other image, and synthesizing the target image and the second image after the ghost removing process.

Other aspects of the present disclosure provides an image compositing program. The image compositing program causes a computer to generate a composite image by synthesizing at least two images from a series of a plurality of images obtained by photographing the same object. The image compositing program causes the computer to function as an acquiring unit, a region detecting unit, and a compositing unit. The acquiring unit acquires a plurality of images including a first image photographed under a first exposure condition at a first timing, a second image photographed under a second exposure condition at a second timing, and a third image photographed under the first exposure condition at a third timing. The region detecting unit compares pixel values of the first image and the third image and detects a moving object region, which is a region where a moving object is present. The compositing unit generates a composite image by synthesizing a target image selected from a plurality of images and the second image. The compositing unit performs a ghost removing process for pixels of the target image corresponding to the moving object region and pixels of the second image corresponding to the moving object region to bring the pixel values of one of these images closer to the pixel values of the other image, and synthesizes the target image and the second image after the ghost removing process.

Other aspects of the present disclosure provides a storage medium. The storage medium is a non-transitory computer readable storage medium in which the image compositing program is stored. The image compositing program causes a computer to operate to synthesize at least two images from a series of a plurality of images obtained by photographing the same object to generate a composite image. The image compositing program causes the computer to function as an acquiring unit, a region detecting unit, and a compositing unit. The acquiring unit acquires a plurality of images including a first image photographed under a first exposure condition at a first timing, a second image photographed under a second exposure condition at a second timing, and a third image photographed under the first exposure condition at a third timing. The region detecting unit compares pixel values of the first image and the third image and detects a moving object region, which is a region where a moving object is present. The compositing unit generates a composite image by synthesizing a target image selected from a plurality of images and the second image. The compositing unit performs a ghost removing process for pixels of the target image corresponding to the moving object region and pixels of the second image corresponding to the moving object region to bring the pixel values of one of these images closer to the pixel values of the other image, and synthesizes the target image and the second image after the ghost removing process.

The image compositing method, the image compositing program, and the storage medium have the same advantageous effects as the above-described image compositing device.

Advantageous Effects of Invention

According to various aspects and the embodiment of the present disclosure, an image compositing device, an image compositing method, and a storage medium capable of suppressing ghosting even in a case of compositing an image including regions having different exposures and an image obtained by normal photography are provided.

DESCRIPTION OF EMBODIMENTS

Figure 1:
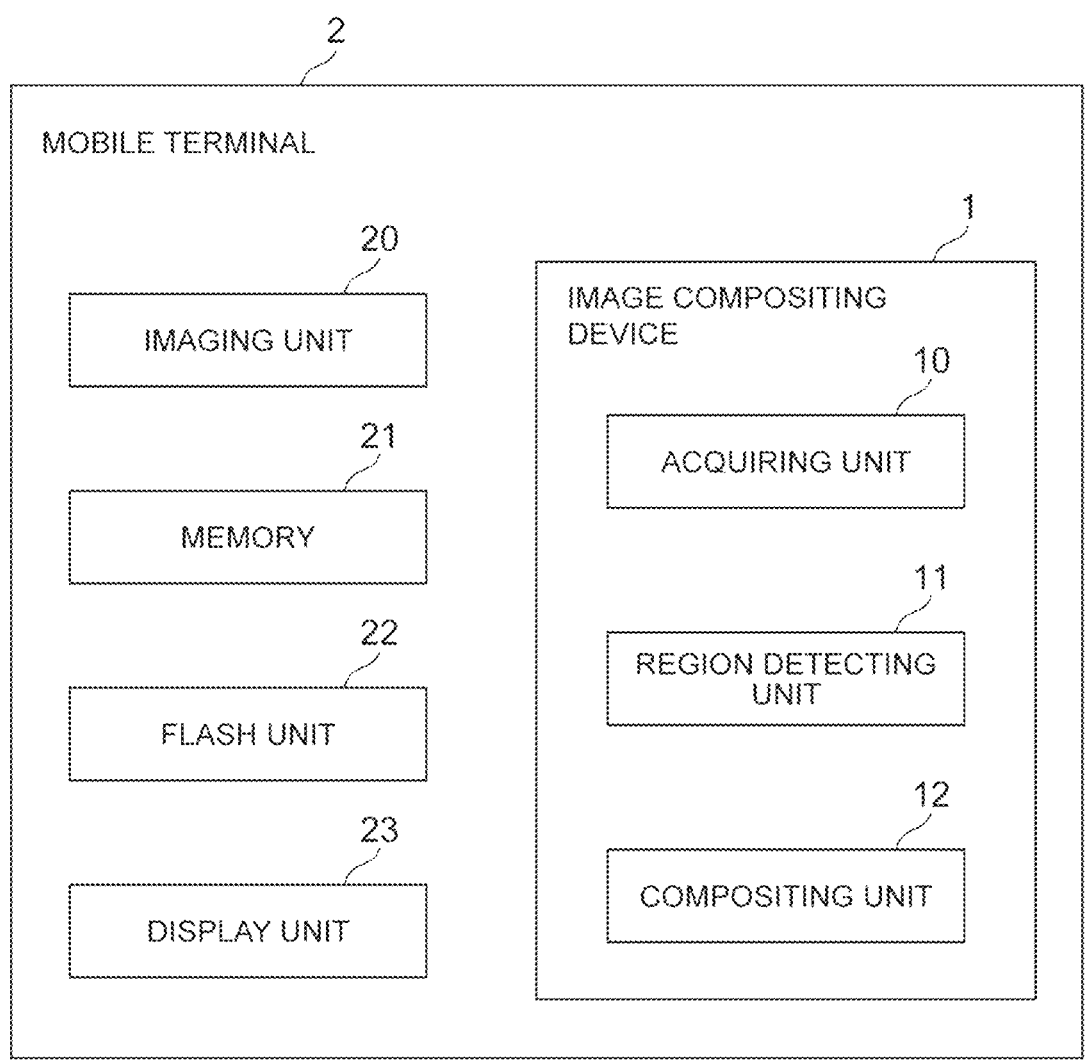
FIG. 1 illustrates a functional block diagram of a mobile terminal equipped with an image compositing device according to an embodiment.

Referring now to the drawings, an embodiment will be described. Note that, in the respective drawings, the same parts or corresponding parts are designated by the same reference numerals and overlapped description will be omitted.

An image compositing device 1 according to the embodiment is a device synthesizing at least two images from a series of a plurality of images obtained by photographing the same object to generate a composite image. As a more specific example, the image compositing device 1 according to the embodiment is a device configured to synthesize an image photographed with flash and an image photographed normally for making both a person and a background bright even at night.

The image compositing device 1 is mounted on a mobile terminal with limited resources such as mobile phones, digital cameras, Personal Digital Assistants (PDAs), and the like. However, the image compositing device 1 is not limited to be mounted on the mobile terminals, and may be mounted, for example, on a normal computer system. The image compositing device 1 may also be a so-called on-chip Image Signal Processor (ISP) assembled in an imaging device. The image compositing device 1 mounted on a mobile terminal will be described below as an example.

Figure 2:
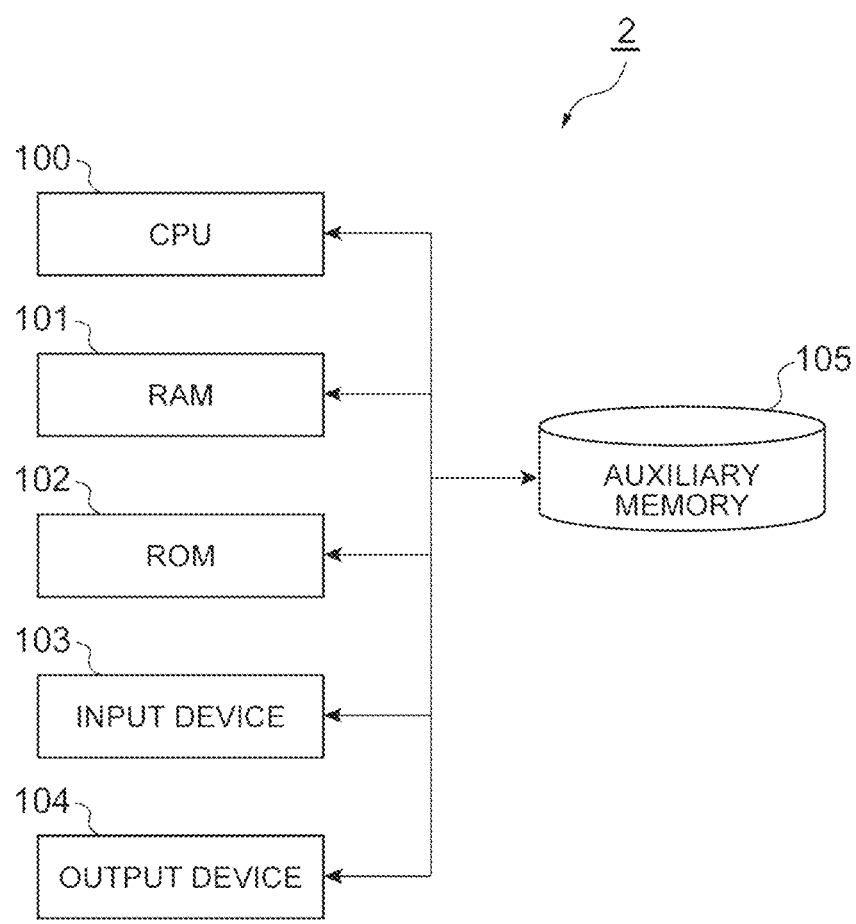
FIG. 2 illustrates a hardware configuration drawing of the mobile terminal equipped with the image compositing device according to the embodiment.

FIG. 1 illustrates a functional block diagram of a mobile terminal 2 equipped with an image compositing device 1. The mobile terminal 2 is, for example, a mobile terminal carried by a user, and has a hardware configuration illustrated in FIG. 2. As illustrated in FIG. 2, the mobile terminal 2 is configured physically as a normal computer system including a Central Processing Unit (CPU) 100, a main memory such as a Random Access Memory (RAM) 101 and a Read Only Memory (ROM) 102, an input device 103 such as a camera or a keyboard, an output device 104 such as a display and a light-emitting device, and an auxiliary memory 105 such as a hard disk. Respective functions of the mobile terminal 2 and the image compositing device 1 are implemented by operating the input device 103 and the output device 104 under control of a CPU 100 by making hardware such as the CPU 100, the RAM 101, and the ROM 102 read predetermined software, and reading and writing data with respect to the main memory or the auxiliary memory 105. Note that while the above-described description has been given as a hardware configuration of the mobile terminal 2, the image compositing device 1 may also be configured as a normal computer system including a main memory such as the CPU 100, the RAM 101, and the ROM 102, the input device 103, the output device 104, and the auxiliary memory 105. The mobile terminal 2 may include a communication module or the like.

Referring back to FIG. 1, the mobile terminal 2 includes functionally an imaging unit 20, a memory 21, a flash unit 22, a display unit 23, and an image compositing device 1.

The imaging unit 20 generates an image by photographing. The imaging unit 20 is implemented by the CPU 100 executing a program in the RAM 101 or the ROM 102, and controlling the input device 103 or the output device 104 such as a camera according to the program.

The memory 21 stores information relating to the image or the camera. The memory 21 corresponds to the main memory or the auxiliary memory 105. The flash unit 22 irradiates flash light in a photographing direction. The flash unit 22 corresponds to the output device 104 such as a light-emitting device.

The imaging unit 20 generates an image by operating the input device 103 or the output device 104 and photographing. The imaging unit 20 generates an image by, for example, referring to photographing conditions stored in the memory 21. The photographing conditions are operating conditions of the input device 103 or the output device 104. More specifically, the photographing conditions is camera setting information such as camera diaphragm setting, shutter speed setting, a light-emission setting of the flash unit 22, and continuous shooting. The photographing conditions may be conditions set by a user operation or the like, or may be stored in the memory 21 in advance as an initial setting. The photographing conditions may include exposure conditions. The exposure conditions are camera setting values affecting the exposure of images and, as a specific example, include an EV value, the camera diaphragm setting and the shutter speed setting, and the light-emission setting of the flash unit 22.

The imaging unit 20 adjusts the exposure of the image when photographing by using flash light of the flash unit 22 based on the photographing conditions. The imaging unit 20 adjusts the exposure of the image so that the image obtained by using the flash light does not include a so called blownout highlight region. As a more specific example, the imaging unit 20 changes an EV value of the camera depending on photographing. The imaging unit 20 changes the EV value of the camera by using any method. For example, the imaging unit 20 may set the EV value of the camera by performing light measurement by pre-flash or may employ the EV value of the camera as a preset value.

The imaging unit 20 photographs a plurality of images or a video. The plurality of images are a series of plurality of images obtained by photographing the same object. As used herein the term "a series of" is intended to mean continuing in time series. The plurality of images include at least three images. The plurality of images include a first image photographed under a first exposure condition at a first timing, a second image photographed under a second exposure condition at a second timing, and a third image photographed under the first exposure condition at a third timing.

The first timing, the second timing, and the third timing are not the same timing, and are timings different from each other. For example, the second timing comes after the first timing, and the third timing comes after the second timing. In this case, the first image, the second image, and the third image are images taken in this order. Since the first image and the third image are images photographed under the same exposure conditions, the first image and the third image have the same exposure. The second image is an image photographed under exposure conditions different from those of the first image and the second image, and thus only the second image has a different exposure. For example, the first image and the third image may be an image (an example of a normally photographed image) taken without irradiation of flash light, and the second image may be an image taken with irradiation of flash light (an example of a flash photographed image). The imaging unit 20 stores a photographed image in the memory 21.

Figure 3:
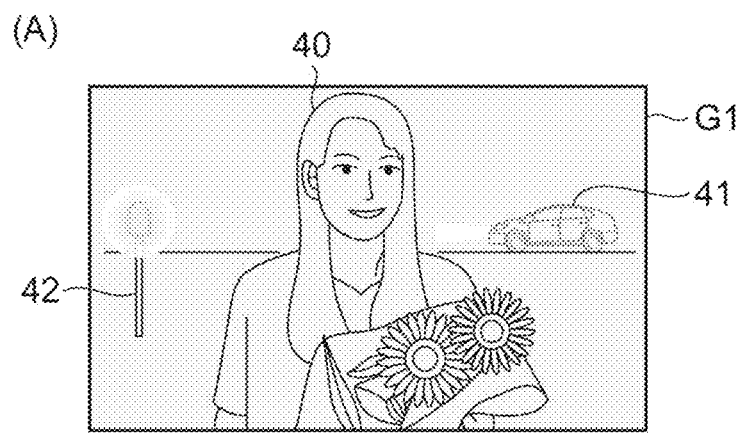
FIG. 3 illustrates an example of a series of plurality of images.
Figure 3:
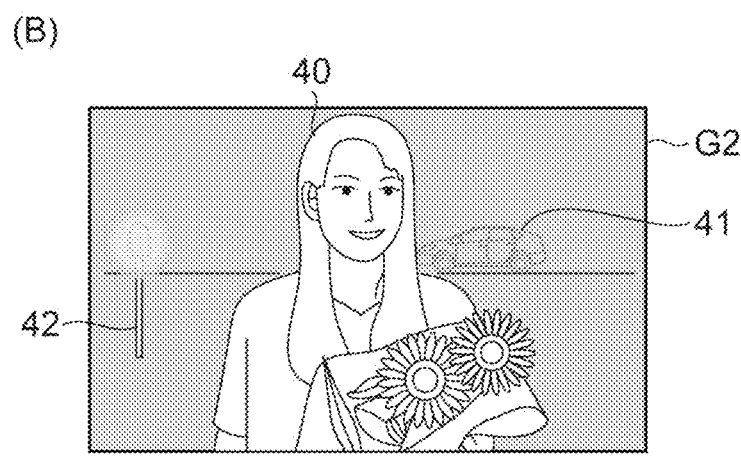
Figure 3:
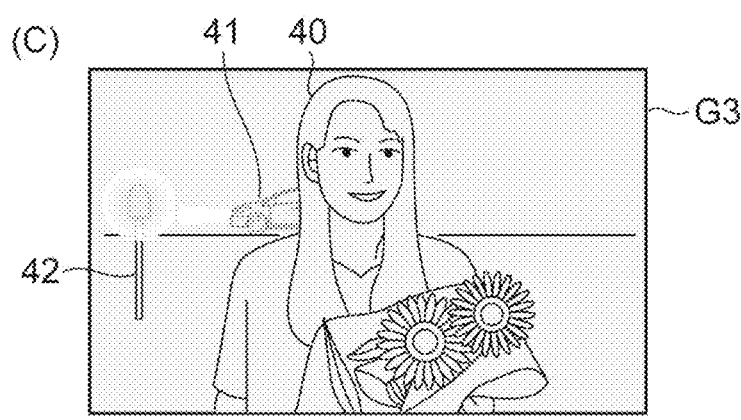

FIG. 3 illustrates an example of the series of a plurality of images. In FIG. 3, (A) illustrates a first image G1, (B) illustrates a second image G2, and (C) illustrates a third image G3. The first image G1, the second image G2, and the third image G3 are images of a person 40, which corresponds to the same object, photographed in this order. The background of the person 40 includes a moving vehicle 41 and a stand-still outdoor light 42. The first image G1 and the third image G3 are normally photographed images at night. Therefore, headlights of the vehicle 41 and the outdoor light 42 appearing behind the person 40 are brighter in the image. In contrast, the second image is a flash photographed image at night. Therefore, the person 40 appears brighter than the background, and in contrast, the vehicle 41 and the outdoor light 42 in the background are darker in the image.

The display unit 23 displays an image according to the user operation or the like. The display unit 23 may display a photographed image stored in the memory 21, or may accept a user operation relating to the photographing conditions by displaying a menu screen. The display unit 23 corresponds to an output device 104 such as a display.

The image compositing device 1 includes an acquiring unit 10, a region detecting unit 11, and a compositing unit 12. The acquiring unit 10 refers to the memory 21 and acquires the series of plurality of images obtained by photographing the same object. The acquiring unit 10 acquires at least three images. The plurality of images include at least two images (for example, the first image and the third image) photographed under the same photographing conditions (for example, the same exposure conditions) and at least one image (for example, the second image) having photographing conditions different from those of the two images (for example, the exposure condition). In the example in FIG. 3, the first image G1, which is a normally photographed image, the second image G2, which is a flash photographed image, and the third image G3, which is the normally photographed image are obtained.

The condition that the first image G1, the second image G2, and the third image G3 are included in the plurality of images is determined based on the photographing conditions associated with these images. This condition may be determined by the acquiring unit 10 and may be determined by the region detecting unit 11.

The region detecting unit 11 compares pixel values of the first image G1 and the third image G3 acquired by the acquiring unit 10 and detects a moving object region, which is a region where a moving object is present. The dynamic object region may be detected by calculating differences between the respective pixels of the first image G1 and the respective pixels of the third image G3 for each resolution and calculating the moving object region of the respective pixels by weighting the differences obtained for each resolution. In this configuration, the region detecting unit 11 is able to reduce time required for a detection process of the moving object region, and is able to avoid generation of holes of detection in the moving object region and generation of irregularly shaped composite image.

The pixel values that the region detecting unit 11 use for comparison are values associated with the pixels constituting the image, and are, for example, luminance values or edge information. The comparison of the pixel values means calculating, for example, differences in pixel value. When a camera position is not fixed, the region detecting unit 11 performs alignment of the first image G1 and the third image G3, and then compares the pixel values. The alignment of the first image G1 and the third image G3 is performed, for example, by calculating the differences in pixel value between the first image G1 and the third image G3 and using a motion vector figured out from the differences.

When the object moves between a first timing when the first image G1 is photographed until the third timing when the third image G3 is photographed, the position of the object in the first image G1 is different from the position of the object in the third image G3. Therefore, the region detecting unit 11 is able to detect the moving object region by comparing the pixel values of the first image G1 and the third image G3.

Figure 4:
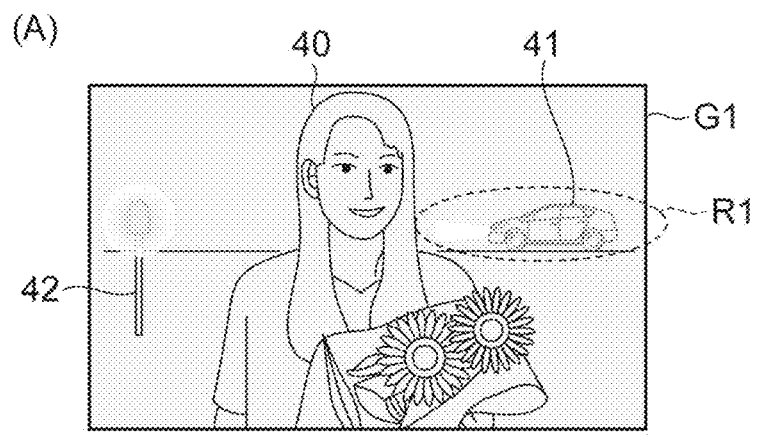
FIG. 4 illustrates an example of moving object regions and a compositing mask.
Figure 4:
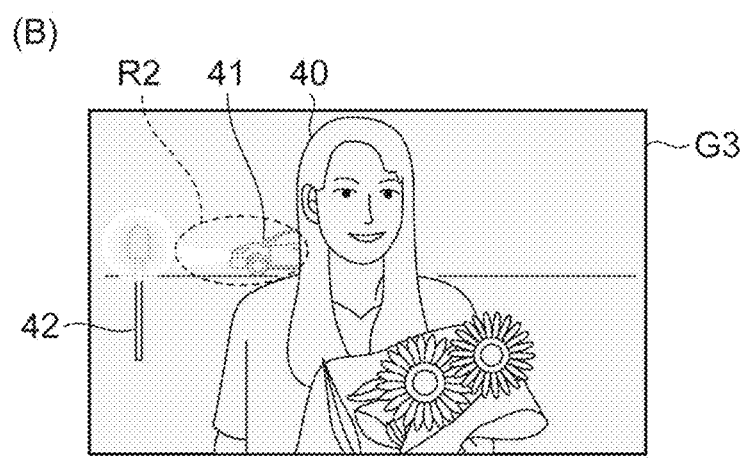
Figure 4:
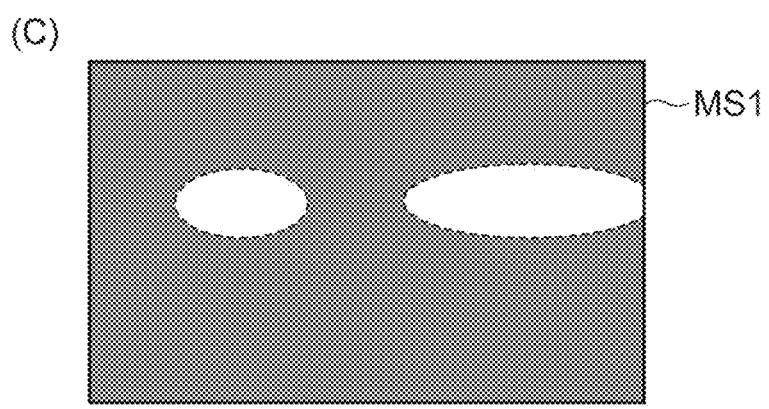

FIG. 4 is an example of the moving object region. As illustrated in (A) and (B), when comparing the first image G1 and the third image G3, a moving object region R1 caused by the vehicle 41 in the first image G1 and a moving object region R2 caused by the vehicle 41 in the third image G3 may be detected. The moving object region R1 and the moving object region R2 may be set with a margin to some extent for pixel regions having differences in pixel value equal to or greater than the predetermined value. Note that in the first image G1 or the third image G3, when a ratio of a moving object region with respect to the entire region of the image is equal to or larger than the predetermined value (30% for example), there is a risk that a preferred composite image cannot be obtained even after performing the compositing process. In this case, the compositing process may not be performed or a process of notifying a user that the user should not perform the compositing process.

The compositing unit 12 synthesizes the flash photographed image and the target image, which is the normally photographed image. The second image G2 is selected as a flash photographed image of the object to be synthesized. The first image G1 or the third image G3 is selected as the normally photographed image to be synthesized. Note that when a fourth image G4, which is a normally photographed image, is acquired by the continuous shooting of four or more images, the fourth images G4 may be selected as the target image. In other words, the compositing unit 12 may select any one of a series of plurality of images obtained by photographing the same object, which are normally photographed images, as a target image. Note that since the accuracy of the moving object region is improved by selecting an image used for detecting the moving object region as a target image, further robust removal of ghosting is achieved.

The compositing unit 12 performs a ghost removing process for pixels of the target image corresponding to the moving object region and pixels of the second image G2 corresponding to a moving object region to bring the pixel values of one of these images closer to the pixel values of the other image, and synthesizes the target image and the second image G2 after the ghost removing process. The compositing unit 12 generates a compositing mask as an example of the ghost removing process. This compositing mask is composed of a moving object region detected by the region detecting unit 11. FIG. 4(C) is an example of the compositing mask configured to mask the moving object region R1 and the moving object region R2 in (A) and (B). The compositing unit 12 synthesizes pixels of the target image corresponding to the moving object region and pixels of the second image G2 corresponding to the moving object region by using a compositing mask. The compositing unit 12 overwrites one of the pixel values of the second image G2 and the pixels values of the target image specified by the compositing mask with the other of those. Accordingly, removal of ghosting is completed. For simplifying the following description, the image on the overwritten side is assumed to be the second image G2.

Figure 5:
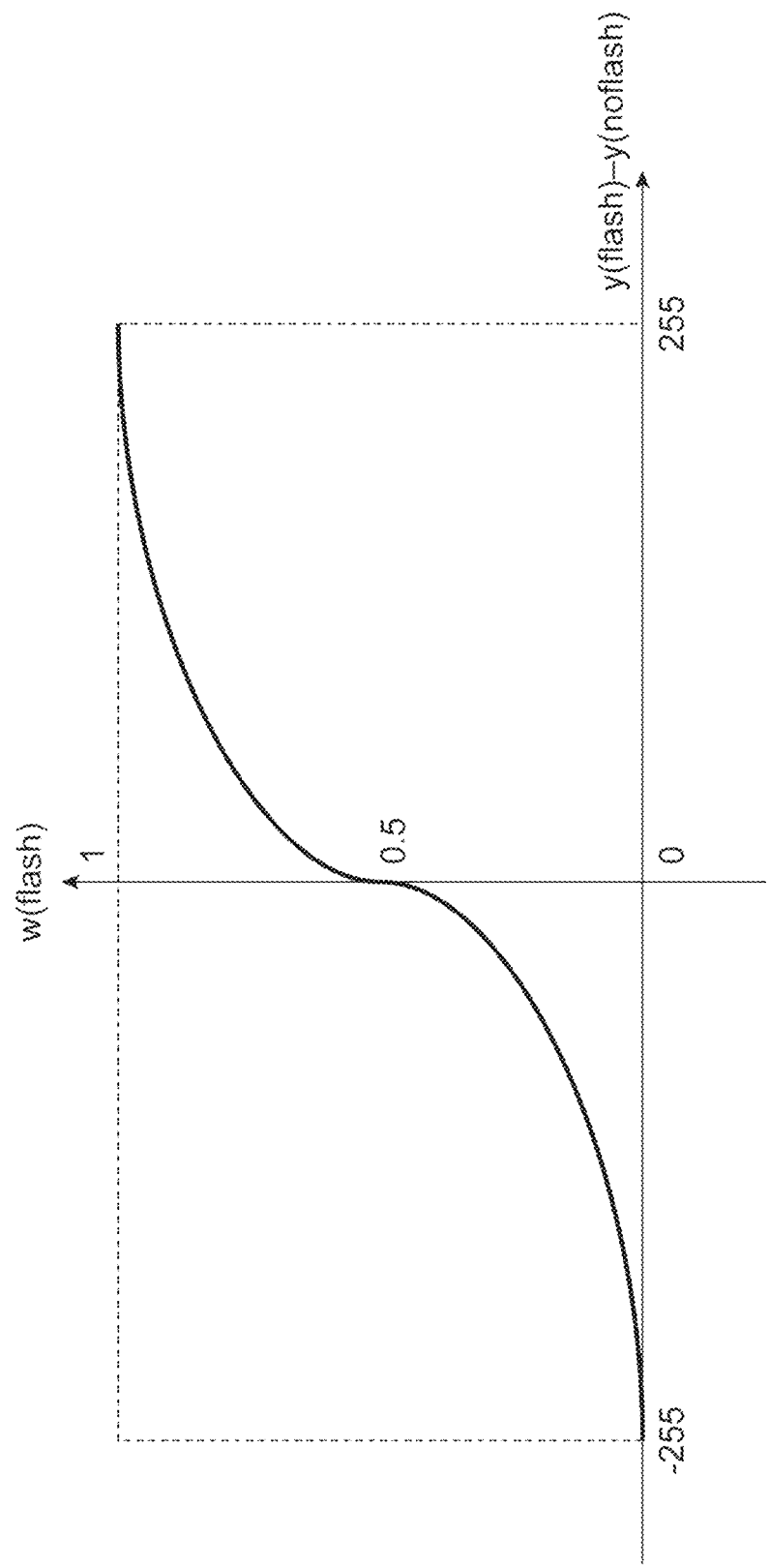
FIG. 5 illustrates an example of a mixing ratio for composition.

After the removal of the ghosting, the compositing unit 12 uses blends pixels of the overwritten second image G2 and the target image based on a mixing ratio determined by the difference between luminance values of the both images. Specifically, the compositing unit 12 performs mixing at the mixing ratio as illustrated in the graph in FIG. 5. In the graph in FIG. 5, the abscissa represents a difference between the luminance value of the second image G2, which is the flash photographed image, and the luminance value of the target image, which is the normally photographed images, and the ordinate represents the weight of the second image G2, which is the flash photographed image.

Here, at the boundary portion between the moving object region and a region other than the moving object region, the compositing mask may be blurred by a predetermined degree in order to avoid generation of a feeling of strangeness at the time of synthesis. In this case, in the above-described ghost removing process, blending is applied to the boundary portion of the compositing mask according to a blurred masking value (degree) instead of overwriting. In other words, a mixing ratio of the pixels corresponding to the moving object region between the target image and the second image G2 is determined according to the masking value.

In addition, the compositing unit 12 may dynamically determine an image to be overwritten based on the result of comparison of the two images. In this case, the image to be overwritten may be the same for all the moving object regions or may be determined for each of the moving object regions. In the latter case, for example, an image determined to be darker is determined as an image to be overwritten out of the second image G2 and the target image for each of the moving object regions. Examples of the method of the determination include, for example, a method of comparing sums of luminance values of respective pixels within the mask and determining the image having a smaller sum as the target image to be overwritten, but the method is not specifically limited. Therefore, when there are a plurality of the moving object regions, both of the second image G2 and the target image may be overwritten for correction.

Figure 6:
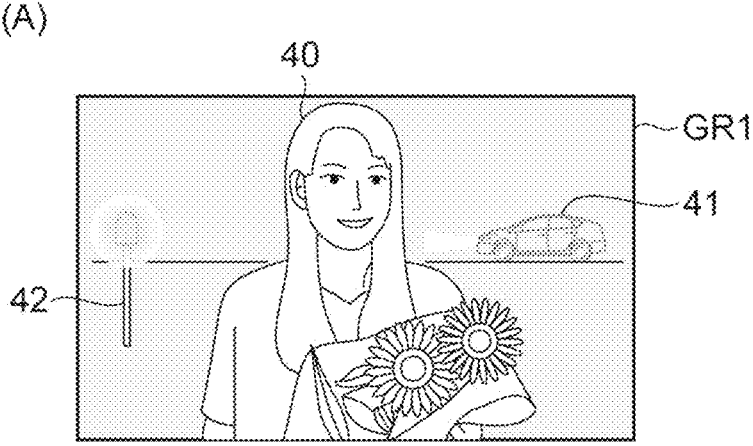
FIG. 6 illustrates examples of an image in which ghosting is corrected, and an image in which ghosting not is corrected.
Figure 6:
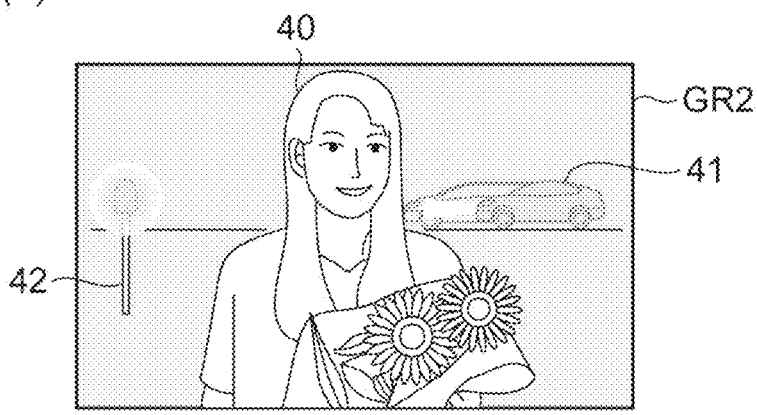

FIG. 6 illustrates an example of an image in which ghosting is corrected, and an image in which ghosting is not corrected. FIG. 6(A) is an example corrected by using the compositing mask illustrated in FIG. 4(C). The first image G1 is selected for each of regions corresponding to the moving object region R1 and the moving object region R2. Therefore, an occurrence of ghosting is avoided in the composite image GR1. In contrast, FIG. 6(B) is an example, in which the ghosting is not corrected. The vehicle 41 illustrated in FIG. 6(A) is a composition of the first image G1 and the second image G2. In this manner, ghosting occurs in the composite image GR2. The compositing unit 12 stores the composite image in the memory 21.

Figure 7:
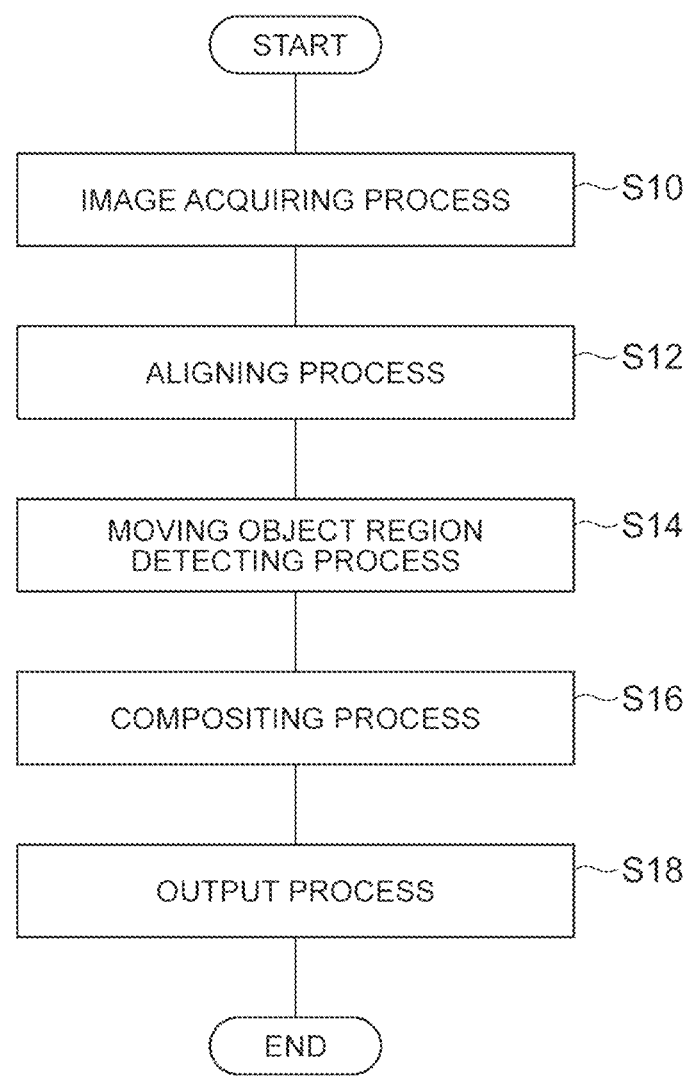
FIG. 7 is a flowchart of a compositing process performed by the compositing image device according to the embodiment.

Next, an image compositing method with the image compositing device 1 will be described. FIG. 7 is a flowchart of the compositing process of the image compositing device 1. The flowchart illustrated in FIG. 7 is executed at a timing of acceptance of a user operation for requesting image processing.

The acquiring unit 10 of the image compositing device 1 acquires a series of plurality of images obtained by photographing the same object by referring to the memory 21 as the image acquiring process (S10: acquiring step). Next, the region detecting unit 11 of the image compositing device 1 performs an alignment of a series of plurality of images as an aligning process (S12). The method of alignment is not specifically limited, and, for example, a method disclosed in U.S. Pat. No. 7,847,823 and any of conventional methods such as a block matching may be simply applied, and the method is not specifically limited. Next, the region detecting unit 11 detects a moving object region based on pixel positions having a difference equal to or greater than the predetermined value as a detecting process (S14: region detecting step). Next, the compositing unit 12 of the image compositing device 1 removes ghosting and performs composition as a compositing process (S16: compositing step). The compositing unit 12 outputs the composite image as the output process (S18).

Next, an image compositing program for making the mobile terminal 2 (computer) function as the image compositing device 1 will be described.

The image compositing program includes a main module, an input module, and an arithmetic processing module. The main module is a portion totally controlling the image processing. The input module operates the mobile terminal 2 so as to acquire an image. The arithmetic processing module includes an acquisition module, a region detection module, and a composition module. The functions implemented by executing the main module, the input module and the arithmetic processing module are the same as the functions of the acquiring unit 10, the region detecting unit 11 and the compositing unit 12 of the image compositing device 1 described above. The image compositing program is provided, for example, by a non-transitory computer readable storage medium such as a ROM or a semiconductor memory.

As described thus far, in the image compositing device 1 according to the embodiment, the moving object region is determined by using two images photographed under the same exposure condition (first exposure condition) out of a series of plurality of images, and the determined moving object region is used when synthesizing an image photographed under an exposure condition (second exposure condition) different from the exposure conditions under which the image used for determining the moving object region is used.

When the pixel values are compared between the images photographed under different exposure conditions, it is impossible to determine whether the pixel values are different between the images due to the difference in exposure condition or the pixel values are different between the images because of the presence of the moving object. For example, even though an attempt is made to compare the flash photographed image and the normally photographed image, there is a risk of appearance of a region having differences over the entire image due to the difference in exposure condition. Since a portion irradiated with flash light is brighter in the flash photographed image, regions having different exposures exist in the flash photographed image.

In contrast, in the image compositing device 1 according to the embodiment, the moving object region may be determined with high degree of accuracy by using images photographed under the same exposure condition out of the series of plurality of images. In other words, even when regions having partially different exposures exist over the entire image, regions having different exposures appear in the same manner if the images are photographed under the same exposure condition, and thus the moving object region may be determined with high degree of accuracy. Since the moving object regions are determined with high degree of accuracy, the device is enabled to suppress the ghosting as a result, even when an image including the regions having different exposures and an image photographed by a normal photography are synthesized.

The image compositing device 1 according to the embodiment is able to enhance the positional accuracy of the moving object region in the second image G2 by detecting the moving object region by using images before and after a photographing timing of the second image G2.

The image compositing device 1 according to the embodiment is able to suppress ghosting caused by the moving object included in the background by overwriting lower illuminance value with the higher luminance value as the ghost removing process. Note that it is also possible to overwrite with the lower luminance value. However, in the embodiment, in a subsequent compositing process S16, it is preferable to perform the process of overwriting with the higher luminance value also in the ghost removing process in response to preferentially synthesizing a higher value between the luminance value of the reference image and the luminance value of the second image.

The image compositing device 1 according to the embodiment is able to enhance the positional accuracy of the moving object region by using the image itself in which the moving object region is detected as a target of composition.

The image compositing device 1 according to the embodiment may be applied to an imaging device having a difficulty in emitting flash continuously in a short time because at least one time of irradiation of flash light will suffice. The image compositing device 1 according to the embodiment is able to select and synthesize pixels corresponding to the moving object region efficiently by using the compositing mask. The image compositing device 1 according to the embodiment is also able to suppress ghosting by performing the process of overwriting one of the pixel values with the other pixel value as the ghost removing process. The image compositing device 1 according to the embodiment performs the ghost removing process by using the compositing mask blurred by a predetermined degree and thus is able to suppress the boundary of the compositing mask from becoming unnatural. The image compositing device 1 according to the embodiment is able to synthesize the target image and the second image while reflecting the difference in luminance between the target image and the second image.

Note that the above-described embodiment presents an example of the image compositing device according to the present disclosure. The image compositing device according to the present disclosure is not limited to the image compositing device 1 and may be the image compositing device of the embodiment modified and applied to other configuration without modifying the gist described in claims.

For example, the second exposure condition may include other types of light irradiated from a spot light source or the like instead of the flash light. The first exposure condition may be a condition of photography with irradiation of flash light and the second exposure condition is a condition of photography without irradiating flash light.

Composition of the flash photographed image and normally photographed image has been described in the above-described embodiment, the compositing process may be any process. For example a compositing process of high dynamic range images by composition of a plurality of images photographed in different exposure conditions is also applicable.

Although two images are photographed under the first exposure condition in the above-described embodiment, it may be difficult to photograph two images under the completely same exposure. In such a case, luminance correction or color tone correction may be performed after the aligning process (S12) so that one of the images matches the other image for the following process.

REFERENCE SIGNS LIST

1 . . . image compositing device, 10 . . . acquiring unit, 11 . . . region detecting unit, 12 . . . compositing unit

The invention claimed is:

1. An image compositing device for generating a composite image by synthesizing at least two images from a series of a plurality of images obtained by photographing an identical object, the device comprising:
    an acquiring unit configured to acquire the plurality of images including a first image photographed under a first exposure condition at a first timing, a second image photographed under a second exposure condition at a second timing, and a third image photographed under the first exposure condition at a third timing;
    a region detecting unit configured to detect a moving object region, which is a region where a moving object is present, by comparing pixel values of the first image and the third image; and
    a compositing unit configured to generate the composite image by synthesizing a target image selected from the plurality of images and the second image, wherein
    the compositing unit performs a ghost removing process for pixels of the target image corresponding to the moving object region and pixels of the second image corresponding to the moving object region to bring the pixel values of one of these images closer to the pixel values of the other image, and synthesizes the target image and the second image after the ghost removing process.

2. The image compositing device according to claim 1, wherein the first image and the third image are images taken without irradiation of flash light, and the second image is an image taken with irradiation of flash light.

3. The image compositing device according to claim 2, wherein the second timing comes after the first timing, and the third timing comes after the second timing.

4. The image compositing device according to claim 3, wherein the ghost removing process may be a process of overwriting one of a pixel value of a pixel of the target image corresponding to the moving object region and a pixel value of a pixel of the second image corresponding to the moving object region with the other pixel value.

5. The image compositing device according to claim 4, wherein the ghost removing process is a process of comparing a luminance value of a pixel of the target image corresponding to the moving object region and a luminance value of a pixel of the second image corresponding to the moving object region and overwriting a lower luminance value with a higher luminance value.

6. The image compositing device according to claim 4, wherein the ghost removing process comprises a process of synthesizing a pixel of the target image corresponding to the moving object region and a pixel of the second image corresponding to the moving object region by using a compositing mask blurred at a predetermined degree.

7. The image compositing device according to claim 2, wherein the ghost removing process may be a process of overwriting one of a pixel value of a pixel of the target image corresponding to the moving object region and a pixel value of a pixel of the second image corresponding to the moving object region with the other pixel value.

8. The image compositing device according to claim 7, wherein the ghost removing process is a process of comparing a luminance value of a pixel of the target image corresponding to the moving object region and a luminance value of a pixel of the second image corresponding to the moving object region and overwriting a lower luminance value with a higher luminance value.

9. The image compositing device according to claim 7, wherein the ghost removing process comprises a process of synthesizing a pixel of the target image corresponding to the moving object region and a pixel of the second image corresponding to the moving object region by using a compositing mask blurred at a predetermined degree.

10. The image compositing device according to claim 1, wherein the second timing comes after the first timing, and the third timing comes after the second timing.

11. The image compositing device according to claim 10, wherein the ghost removing process may be a process of overwriting one of a pixel value of a pixel of the target image corresponding to the moving object region and a pixel value of a pixel of the second image corresponding to the moving object region with the other pixel value.

12. The image compositing device according to claim 11, wherein the ghost removing process is a process of comparing a luminance value of a pixel of the target image corresponding to the moving object region and a luminance value of a pixel of the second image corresponding to the moving object region and overwriting a lower luminance value with a higher luminance value.

13. The image compositing device according to claim 11, wherein the ghost removing process comprises a process of synthesizing a pixel of the target image corresponding to the moving object region and a pixel of the second image corresponding to the moving object region by using a compositing mask blurred at a predetermined degree.

14. The image compositing device according to claim 1, wherein the ghost removing process may be a process of overwriting one of a pixel value of a pixel of the target image corresponding to the moving object region and a pixel value of a pixel of the second image corresponding to the moving object region with the other pixel value.

15. The image compositing device according to claim 14, wherein the ghost removing process is a process of comparing a luminance value of a pixel of the target image corresponding to the moving object region and a luminance value of a pixel of the second image corresponding to the moving object region and overwriting a lower luminance value with a higher luminance value.

16. The image compositing device according to claim 14, wherein the ghost removing process comprises a process of synthesizing a pixel of the target image corresponding to the moving object region and a pixel of the second image corresponding to the moving object region by using a compositing mask blurred at a predetermined degree.

17. The image compositing device according to claim 1, wherein the compositing unit synthesizes the target image and the second image by using a mixing ratio determined by a difference between luminance values of the target image and the second image after the ghost removing process.

18. The image compositing device according to claim 1, wherein the target image is the first image or the third image.

19. An image compositing method for generating a composite image by synthesizing at least two images from a series of a plurality of images of an identical object, the method comprising:
    an acquiring step for acquiring the plurality of images including a first image photographed under a first exposure condition at a first timing, a second image photographed under a second exposure condition at a second timing, and a third image photographed under the first exposure condition at a third timing;
    a region detecting step for comparing pixel values of the first image and the third image and detecting a moving object region, which is a region where a moving object is present; and
    a compositing step for generating the composite image by synthesizing a target image selected from the plurality of images and the second image,
    wherein
    the compositing step comprises performing a ghost removing process for a pixel of the target image corresponding to the moving object region and a pixel of the second image corresponding to the moving object region to bring the pixel value of one of these images closer to the pixel value of the other image, and synthesizing the target image and the second image after the ghost removing process.

20. A non-transitory computer readable storage medium for storing an image compositing program causing a computer to operate to generate a composite image by synthesizing at least two images from a series of a plurality of images obtained by photographing an identical object,
    the image compositing program causing the computer to operate as
    an acquiring unit configured to acquire the plurality of images including a first image photographed under a first exposure condition at a first timing, a second image photographed under a second exposure condition at a second timing, and a third image photographed under the first exposure condition at a third timing;
    a region detecting unit configured to compare pixel values of the first image and the third image and detecting a moving object region, which is a region where a moving object is present; and a compositing unit configured to generate the composite image by synthesizing a selected target image selected from the plurality of images and the second image, wherein the compositing unit performs a ghost removing process for pixels of the target image corresponding to the moving object region and pixels of the second image corresponding to the moving object region to bring the pixel values of one of these images closer to the pixel values of the other image, and synthesizes the target image and the second image after the ghost removing process.

\* \* \* \* \*